Dec. 11, 1951    C. E. HUNT, JR    2,578,307

FACSIMILE SCANNING DEVICE

Filed Jan. 21, 1948

Clayton E. Hunt, Jr.
INVENTOR

BY Newton M. Perrins
Ralph L. Carter
ATTORNEYS

Patented Dec. 11, 1951

2,578,307

UNITED STATES PATENT OFFICE 2,578,307

FACSIMILE SCANNING DEVICE

Clayton E. Hunt, Jr., Rochester, N. Y., assignor to Eastman Kodak Company, Rochester, N. Y., a corporation of New Jersey Application January 21, 1948, Serial No. 3,427

4 Claims. (Cl. 178—6.6)

This invention relates to the facsimile reproduction of pictures and documents and more particularly to an improved apparatus whereby special subjects may be copied to better advantage and more cheaply than heretofore.

In reproducing or copying documents, it is frequently desirable to extract for copying purposes selected portions or areas of the document and it would be very convenient to be able to rearrange or reorganize in the copy the extracted material. Modern businesses increasingly rely on documentary instrumentalities in the conduct of their operations. These instrumentalities usually are discrete documents definite in shape and size, and the information or data contained thereon is located in accordance with its subject matter. This means that if selected areas of a document or card can be reproduced the material copied may be limited to what is desired and it will not be necessary to reproduce the whole document nor even continuous areas thereof.

The primary object of the invention is the provision of a mechanical facsimile scanning apparatus which will scan spaced bands without scanning the spaces between the bands thereby economizing on time.

A specific object of the invention is to provide a facsimile apparatus for copying address labels from business machine cards whereby the ratio between letter height and vertical spacings may be altered.

The invention will be understood from the following description when read in connection with the accompanying drawing and its scope will be pointed out in the appended claims.

In accordance with the form of the invention to be described in detail, a scanning unit of the helical type has its scanning element arranged on a cylindrical drum so that it is continuous circumferentially of the drum and discontinuous longitudinally of the drum. The helical arrangement of the slots is a specific improvement over the optical arrangement disclosed in U. S. Patent No. 2,510,200, granted June 6, 1950, to Russell G. Thompson, and generically claimed therein.

Figures 1, 2, 3:
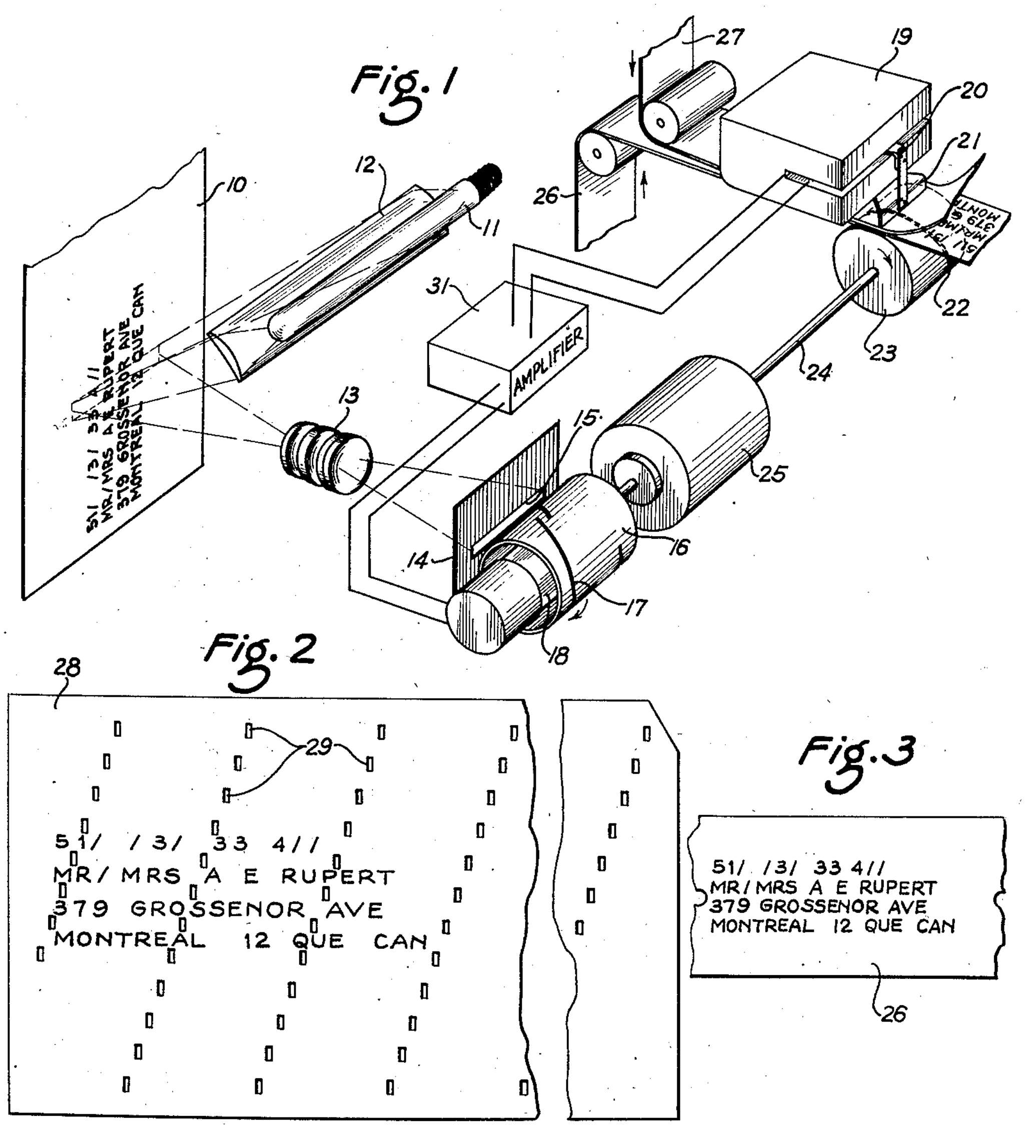
Fig. 1 is a partial view in perspective of a facsimile apparatus embodying the invention.
Fig. 2 shows fragments of a business machine card carrying an address to be copied.
Fig. 3 shows an address label copied from the card of Fig. 2 with the apparatus of Fig. 1.

In the apparatus illustrated a card 10 bearing an address to be copied is illuminated by a suitable system shown as comprising a lamp 11 and a cylindrical condensing lens 12 and is imaged by a lens 13 onto a plate 14 having an aperture 15 which cooperates with a rotatable drum 16 provided with a helical slit 17 to form a scanning device. Light from the image, transmitted by the aperture 15 and the slit 17 is caused to fall on a light-sensitive cell 18 which develops a signal corresponding to the amount of light reflected from elemental areas of the card 10 as it is scanned. This signal from the cell 18 is suitably amplified by an amplifier 31 and fed to any well known facsimile recorder and is here shown as an electromagnetic device 19 having an armature 20 which drives a straight edge 21 in such manner that it is forced down on dark signals and lifted on light signals. Now with a printing anvil placed beneath the straight edge 21 and moved in synchronism with the scanning drum 16 a straightforward recording head is provided through which a recording medium may be passed. As shown, the printing anvil comprises a helical ridge 22 carried on a drum 23 mounted on the shaft 24 of a motor 25. The scanning drum 16 is also mounted on the shaft of the motor 25 and thus once the two drums 16 and 23 are secured to this shaft in proper relation synchronism is automatic. A strip of paper 26 and an overlapping strip of carbon paper 27 are passed between the signal vibrated bar 21 and the helical printing anvil 22 to record in a well known manner.

When it is desired to record on the tape 26 an address such as is carried on a card 28 of the type shown in Fig. 2 it is apparent that the spacings between the lines of print are greater than needed for address labels and that these spaces include several of the perforations 29 representing data stored on the card 28. The present invention makes it possible to produce from the card 28 an address label on the paper tape 26 in the form shown in Fig. 3 in a manner now to be described.

The spiral slit 17 in the drum 16 is broken into segments equal in number to the number of lines in the address and having scanning lengths equal to or slightly greater than the heights of the printed matter in the lines of the address. This means that the segments are displaced longitudinally of the drum 16 by distances almost equal to the spaces between the printed lines on the card 28 so that for each revolution of the drum 16 a discontinuous line is scanned across the address on the card 28. It should be pointed out that although the scanning line is discontinuous in space it is continuous in time because just prior to one of the segments 17 leaving the cooperating scanning aperture 15 another segment enters.

Figure 4:
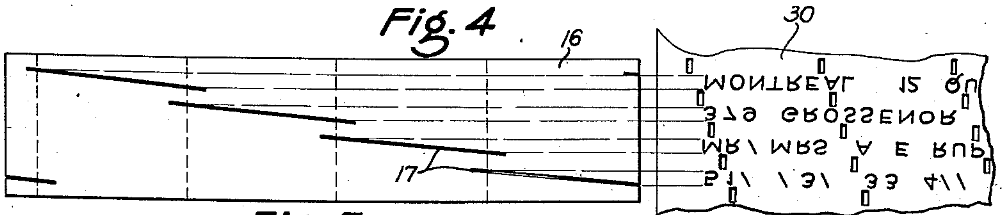
Fig. 4 is a view showing the development of a scanning drum of Fig. 1 and its relation to an image to be scanned.
Figure 5:
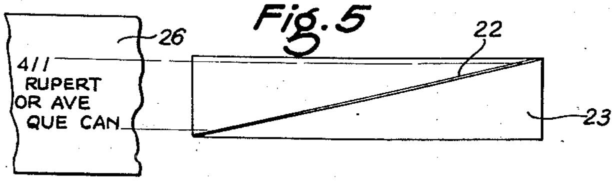
Fig. 5 is a view showing the development of the printing drum and its relation to the copy printed thereby.

The above scanning operation is illustrated in Fig. 4 wherein a development of the drum 16 is shown in its relationship to an image 30 of the card 28. Similarly, Fig. 5 shows in development the relationship between the printing anvil 22 and a fragment of tape 26 which has just been recorded. It will be noted by reference to Fig. 1 that the recorded matter on the tape 26 is a mirror image of the image 30 scanned by the drum 16. If instead of scanning the image 30, the card 28 were scanned directly the paper tape 26 and the carbon paper 27 would be reversed in position in order to secure proper recording.

Obviously the above reproducing operation is reversible so that by making the helical slit 17 continuous and the helical printing anvil 22 discontinuous the address label 26 can be reproduced with increased spacings as shown on card 28. By making both the slit 17 and anvil 22 segmented the possibilities of use are increased without decreasing the speed of reproduction which depends on the length of the line actually scanned. Further, the helical segments need not be in order longitudinally of the drum, since all that is required is that each segment occupy its allotted angle, and they may be given different pitches, including reverse ones, to alter selectively the relative widths of the bands in the reproduction. Also the segments need not be on the same drum as long as their correct angular relationship is maintained. It is thus apparent that the invention provides a very flexible tool for assembling, segregating or rearranging copy material.

While the invention has been described in connection with the reproduction of four spaced lines of printed matter carried on a punched card, it is to be understood that the invention is not restricted to this particular embodiment since this has been chosen for the purpose of illustrating the invention and many modifications will readily suggest themselves to those skilled in the art.

It is also to be understood that the showing herein is not a working drawing for building a complete machine but is for the purpose of explaining the invention to one skilled in this art. It would tend to obscure rather than reveal the invention if the drawing showed complete mechanical details such as extraneous light excluding casings around the pick-up scanning head, advancing means for the paper tape 26 and carbon paper 27, document feeding means, and various supporting structures.

It will be apparent from the foregoing that the invention can readily be embodied in many different forms to meet different conditions and it is intended to cover by the appended claims all modifications within the scope of the invention.

I claim:

1. In a facsimile line-scanning apparatus a rotatable cylinder provided about the periphery thereof with a plurality of spaced helical scanning elements, each of which extends about a portion of the cylinder, said plurality of elements substantially completely circumscribing said cylinder, and the beginning of each helical element being displaced from the end of the preceding element in a direction parallel to the axis of the cylinder, said helical elements being adapted thereby to scan the spaced segments of a line which is parallel to the axis of said cylinder.

2. A facsimile scanning device comprising a rotatable drum having a plurality of helical slits consecutively arranged around the periphery of the drum, the beginning of each helical slit being displaced longitudinally along the drum from the end of the preceding slit, and means defining a linear aperture longitudinally of and closely adjacent to the drum, said slits being so disposed circumferentially of the drum that they cooperate in succession with the linear aperture to provide a scanning aperture and the adjacent ends of consecutive slits being so displaced longitudinally that upon rotation of the drum the scanning aperture moves along spaced segments of the linear aperture.

3. In facsimile apparatus for scanning spaced parallel bands, a hollow rotatable cylinder provided with helical slits distributed around the circumference of the cylinder, the sum of the angles subtended by the slits being substantially 360 degrees, and the slits being spaced longitudinally of said cylinder in accordance with the spacing of the bands to be scanned, and a stationary plate having an aperture extending longitudinally of said cylinder for cooperating with said slits to provide a scanning aperture for traversing only the spaced parallel bands.

4. A facsimile scanning device comprising a rotatable drum provided with a plurality of spaced helical scanning elements arranged around the periphery of the drum, said helical elements being successively disposed circumferentially about the drum and the beginning of each element being displaced from the end of the preceding element in a direction parallel to the axis of the drum, whereby rotation of the drum will cause said helical elements to successively scan without interruption the spaced segments of a line which is parallel to the axis of said drum.

CLAYTON E. HUNT, Jr.

REFERENCES CITED

The following references are of record in the file of this patent:

UNITED STATES PATENTS

| Number | Name | Date |
|---|---|---|
| 562,834 | Knauss et al. | June 30, 1896 |
| 738,480 | Pollack | Sept. 8, 1903 |
| 1,859,828 | Jenkins | May 24, 1932 |
| 1,862,455 | Barnecut | June 7, 1932 |
| 1,945,968 | De Amicis | Feb. 6, 1934 |
| 1,963,255 | Zimber | June 19, 1934 |
| 2,046,328 | Kleinschmidt | July 7, 1936 |
| 2,230,502 | Pearson | Feb. 4, 1941 |
| 2,251,786 | Epstein | Aug. 5, 1941 |
| 2,289,427 | Hoyt | July 14, 1942 |
| 2,356,878 | Young | Sept. 19, 1944 |

FOREIGN PATENTS

| Number | Country | Date |
|---|---|---|
| 355,795 | Great Britain | Aug. 24, 1931 |
| 384,207 | Great Britain | Dec. 1, 1932 |